United States Patent
Copty et al.

(10) Patent No.: US 7,752,006 B2
(45) Date of Patent: Jul. 6, 2010

(54) DEVICE, SYSTEM AND METHOD OF GENERATING A HARDWARE-VERIFICATION TEST CASE

(75) Inventors: Shady Copty, Nazareth (IL); Alex Goryachev, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 11/764,817

(22) Filed: Jun. 19, 2007

(65) Prior Publication Data

US 2008/0319729 A1    Dec. 25, 2008

(51) Int. Cl.
*G06F 11/00* (2006.01)
*G06F 17/00* (2006.01)

(52) U.S. Cl. .............. 702/123; 702/119; 702/108; 703/13; 703/14

(58) Field of Classification Search .......... 702/123, 702/119, 108
See application file for complete search history.

(56) References Cited

U.S. PATENT DOCUMENTS

| 5,469,367 | A  | * | 11/1995 | Puri et al. ............... 716/18 |
| 5,513,350 | A  | * | 4/1996  | Griffin et al. ............ 717/106 |
| 5,913,023 | A  | * | 6/1999  | Szermer .................. 714/38 |
| 6,260,162 | B1 |   | 7/2001  | Typaldos et al. |
| 7,370,296 | B2 | * | 5/2008  | Koyfman et al. ......... 716/3 |
| 7,512,912 | B1 | * | 3/2009  | Iyer ....................... 716/4 |
| 2005/0039077 | A1 | * | 2/2005 | Iyer ................... 714/25 |
| 2006/0212756 | A1 | * | 9/2006 | Emek et al. ........... 714/30 |
| 2006/0218513 | A1 | * | 9/2006 | Dozorets et al. ........ 716/5 |
| 2007/0011631 | A1 | * | 1/2007 | Fine et al. ............. 716/5 |
| 2008/0115027 | A1 | * | 5/2008 | Geller et al. ......... 714/738 |

OTHER PUBLICATIONS

Test Sequence Generation: Methodology and Rules (Apr. 30, 2004), pp. 1-34.

* cited by examiner

*Primary Examiner*—Hal D Wachsman

(57) ABSTRACT

Some demonstrative embodiments of the invention may include, for example, devices, systems and methods of performing functional verification of a hardware design. In some demonstrative embodiments, a test generator may include a transaction generator to automatically generate a plurality of manipulated transactions by manipulating one or more test case transactions resulting from a constraint-satisfaction-problem.

20 Claims, 2 Drawing Sheets

DEVICE, SYSTEM AND METHOD OF GENERATING A HARDWARE-VERIFICATION TEST CASE

FIELD

Some embodiments of the invention are generally related to the field of verification of a hardware design and, more particularly, to generating one or more hardware-verification test cases.

BACKGROUND

A design verification system may utilize simulation-based techniques to perform functional verification of a hardware design. The simulation-based techniques may include generating stimuli, for example, in the form of test cases, to trigger architecture and/or micro-architecture events defined by a verification plan.

A test generator may be used to generate test cases based, for example, on the verification plan, which may be provided to the test generator as an input specification of a test template including a set of constrains representing, for example, validity, quality, and/or test specification requirements. For example, in relation to a translation table a validity constraint may require that RA=trans(EA), wherein EA denotes an effective address, and RA denotes a real ("physical") address. A quality constraint relating to the translation table may require, for example, that a plurality of load and store instructions access the same cache line.

The test generator typically generates test cases by solving one or more constraint satisfaction problems (CSPs). The test generator may construct a CSP from user requirements and a system model, and produce a plurality of distinct program instances that satisfy the set of constraints. The quality constraints may be treated as soft-constraints, in the sense that the test generator tries to satisfy the quality constraints, e.g., as many of the quality constraints as possible according to a certain hierarchy, but a solution is still valid even if not all the quality constraints satisfied.

The general CSP problem is known to be Non-deterministic Polynomial (NP)-complete and, accordingly, the process of solving the CSP problem may be relatively slow.

The verification of some hardware designs may require the use of relatively long test cases, e.g., including a relatively large number of test case transactions.

A shorter verification process may be desired, e.g., in order to achieve a shorter time-to-market. The complexity of modern hardware designs may require the simulation of many different long and/or high-quality test cases. As a result, generating long test cases, e.g., of high quality and/or within a short time period is required.

SUMMARY

Some embodiments of the invention may include, for example, devices, systems and methods of performing functional verification of a hardware design.

According to some demonstrative embodiments of the invention, a test generator may include a transaction generator to automatically generate a plurality of manipulated transactions by manipulating one or more test case transactions resulting from a constraint-satisfaction-problem.

According to some demonstrative embodiments of the invention, the test generator may also include a constraint-satisfaction-problem engine to generate the test case transactions, and a refiner to generate a test case based on the plurality of manipulated transactions.

According to some demonstrative embodiments of the invention, the transaction generator is to manipulate the one or more test case transactions based on at least one manipulation instruction.

According to some demonstrative embodiments of the invention, the transaction generator is to selectively manipulate a transaction of the one or more test case transactions based on one or more parameters of the transaction. The one or more parameters include, for example, a name of the transaction.

According to some demonstrative embodiments of the invention, the transaction generator is to manipulate the transaction if a post-condition of the transaction does not affect any of the test case transactions.

According to some demonstrative embodiments of the invention, the transaction generator is to reconstruct one or more preconditions relating to the transaction if a post-condition of the transaction affects at least one of the test case transactions.

According to some demonstrative embodiments of the invention, the plurality of manipulated transactions may include at least one permutation of a set of two or more of the test case transactions, the permutation including at least first and second different arrangements of the set of transactions.

According to some demonstrative embodiments of the invention, the plurality of manipulated transactions may include one or more mutated transactions corresponding to a test case transaction of the test case transactions. The transaction generator is to generate the one or more mutated transactions, for example, by modifying one or more elements of the test case transaction.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
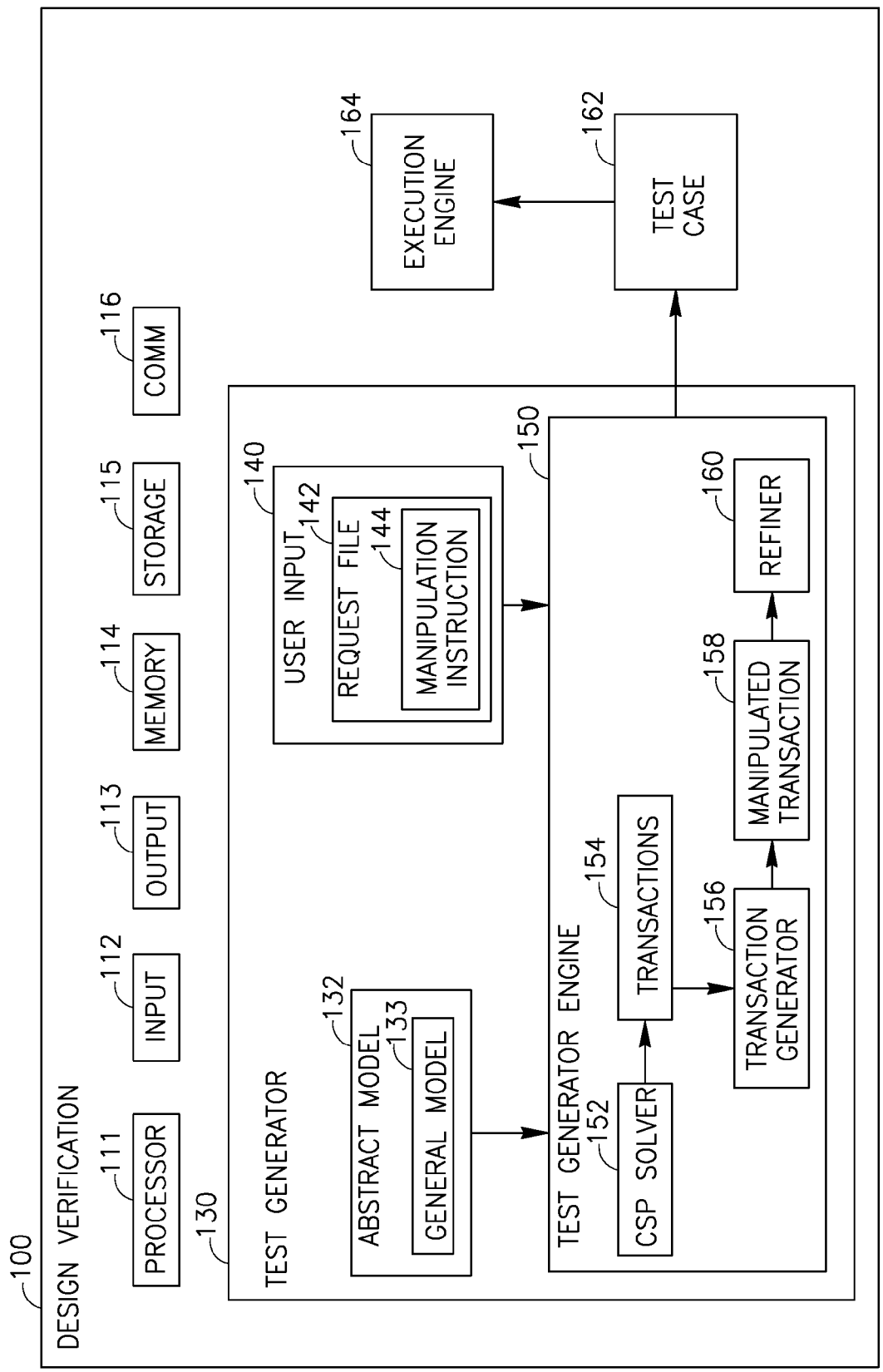
FIG. 1 schematically illustrates a design verification system, in accordance with some demonstrative embodiments of the invention.

In the following detailed description, numerous specific details are set forth in order to provide a thorough understanding of some embodiments of the invention. However, it will be understood by persons of ordinary skill in the art that embodiments of the invention may be practiced without these specific details. In other instances, well-known methods, procedures, components, units and/or circuits have not been described in detail so as not to obscure the discussion.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of items" may include two or more items.

Although portions of the discussion herein may relate, for demonstrative purposes, to wired links and/or wired communications, embodiments of the invention are not limited in this regard, and may include one or more wired links, may utilize one or more components of wireless communication, may utilize one or more methods or protocols of wireless communication, or the like. Some embodiments of the invention may utilize wired communication and/or wireless communication.

Although the invention is not limited in this respect, the term "manipulating" as used herein with relation to one or more transactions may include changing, altering, modifying, mutating and/or permuting the one or more transactions.

Although the invention is not limited in this respect, the term "permuting" as used herein with relation to a plurality of transactions includes duplicating the plurality of transactions and changing the order of one or more of the transactions, to generate a permutated plurality of transactions. For example, a plurality of transactions including three transactions, denoted a, b, and c, respectively, in the order [a,b,c] may be permutated to generate a second plurality of transactions, e.g., in the order [b, a, c].

Although the invention is not limited in this respect, the term "mutating" as used herein with relation to a transaction includes duplicating and changing, altering and/or modifying one or more elements of the transaction, e.g., by modifying a length, address, data and/or any other suitable element of the transaction, to generate a mutated transaction.

At an overview, in some demonstrative embodiments, a design verification system may include a stimuli generator to automatically generate a set of manipulated test case transactions by manipulating test case transactions ("CSP-generated transactions") resulting from a Constraint-Satisfaction Problem (CSP). The stimuli generator may include, or may be part of, a test generator adapted to generate at least one test case based on the manipulated test case transactions.

In some demonstrative embodiments of the invention, the stimuli generator generates the manipulated transactions by duplicating, permuting and/or mutating at least some of the CSP-generated transactions.

In some demonstrative embodiments of the invention, the test generator may identify and/or classify a CSP-generated transaction as a "type-1" transaction, e.g., a transaction having a post-condition, which does not affect preconditions of any of the CSP-generated transactions, e.g., including the transaction itself; or as a "type-2" transaction, e.g., a transaction which renders the preconditions of one or more of the CSP-generated transactions unsatisfied, once the transaction is performed.

In some embodiments, the type-1 transactions may be duplicated; mutated, e.g., within a precondition range, which does not affect the post-conditions of the CSP-generated transactions; and/or permuted in any suitable order. A type-2 transaction may be manipulated, for example, by duplicating and/or mutating one or more initializations, which enable reconstructing the precondition of the transaction.

Although the invention is not limited in this respect, in some demonstrative embodiments the test generator may be implemented using an "abstraction-refinement" scheme. In one example, the test generator includes a CSP solver to generate a set of transactions, e.g., abstract transactions; and a transaction generator to generate a set of manipulated test case transactions by manipulating the CSP-generated transactions. The test generator also includes a refiner to refine the manipulated transactions and generate a test case. In one example, the transaction generator identifies and/or classifies the abstract transactions as either type-1 or type-2 transactions, e.g., based on the names of the abstract transactions. The transaction generator may duplicate, mutate and/or permute the transactions classified as type-1; and/or duplicate transactions classified as type-2, e.g., while reconstructing their preconditions, for example, by creation or duplication and mutation of previous initializations.

In some demonstrative embodiments, the set of manipulated test case transactions includes a relatively large number of transactions compared, for example, to the number of CSP-generated transactions. In one example, the number of manipulated test case transactions is at least 50 times, for example, at least 100 times, e.g., at least 200 times, bigger than the number of CSP-generated transactions.

The computational complexity of manipulating the CSP-generated transactions may be relatively low compared, for example, to the computational complexity required to generate substantially the same number of test case transactions by directly solving a CSP problem. Accordingly, the test generator according to demonstrative embodiments of the invention may automatically generate a relatively long test case, e.g., including a relatively large number of transactions, at a relatively short time period, e.g., compared to the time period required to generate substantially the same number of test case transactions by directly solving a CSP problem.

In addition, the test generator according to some demonstrative embodiments of the invention may automatically generate a test case having a relatively high quality level, e.g., a test case including a large number of non-identical transactions.

Reference is made to FIG. 1, which schematically illustrates a design verification system 100, in accordance with some demonstrative embodiments of the invention. System 100 may optionally be implemented or may operate, for example, using a computing device, a computer, a personal computer (PC), a server computer, a client/server system, a mobile computer, a portable computer, a laptop computer, a notebook computer, a tablet computer, or the like.

In some demonstrative embodiments, system 100 may include, for example, a processor 111, an input unit 112, an output unit 113, a memory unit 114, a storage unit 115, and/or a communication unit 116. System 100 optionally includes other suitable hardware components and/or software components.

In some demonstrative embodiments, processor 111 includes, for example, a central processing unit (CPU), a digital signal processor (DSP), a microprocessor, a host processor, a controller, a plurality of processors or controllers, a chip, a microchip, one or more circuits, circuitry, a logic unit, an integrated circuit (IC), an application-specific IC (ASIC), or any other suitable multi-purpose or specific processor or controller. Processor 111 may, for example, execute instructions, execute one or more software applications, and process signals and/or data transmitted and/or received by system 100.

In some demonstrative embodiments, input unit 112 includes, for example, a keyboard, a keypad, a mouse, a touch-pad, a stylus, a microphone, or other suitable pointing device or input device. Output unit 113 include, for example, a cathode ray tube (CRT) monitor or display unit, a liquid crystal display (LCD) monitor or display unit, a screen, a monitor, a speaker, or other suitable display unit or output device.

In some demonstrative embodiments, memory unit 114 includes, for example, a random access memory (RAM), a read only memory (ROM), a dynamic RAM (DRAM), a synchronous DRAM (SD-RAM), a flash memory, a volatile memory, a non-volatile memory, a cache memory, a buffer, a short term memory unit, a long term memory unit, or other suitable memory units or storage units. Storage unit 115 includes, for example, a hard disk drive, a floppy disk drive, a compact disk (CD) drive, a CD-ROM drive, a digital versatile disk (DVD) drive, or other suitable removable or non-removable storage units. Memory unit 114 and/or storage unit 115 may, for example, store data processed by system 100.

In some demonstrative embodiments, communication unit 116 includes, for example, a wired or wireless network interface card (NIC), a wired or wireless modem, a wired or wireless receiver and/or transmitter, a wired or wireless transmitter-receiver and/or transceiver, a radio frequency (RF) communication unit or transceiver, or other units able to transmit and/or receive signals, blocks, frames, transmission streams, packets, messages and/or data. Communication unit 116 may optionally include, or may optionally be associated with, for example, one or more antennas, e.g., a dipole antenna, a monopole antenna, an omni-directional antenna, an end fed antenna, a circularly polarized antenna, a micro-strip antenna, a diversity antenna, or the like.

In some demonstrative embodiments, the components of system 100 are enclosed in, for example, a common housing, packaging, or the like, and are interconnected or operably associated using one or more wired or wireless links. In other embodiments, for example, components of system 100 may be distributed among multiple or separate devices, may be implemented using a client/server configuration or system, may communicate using remote access methods, or the like.

In some demonstrative embodiments, system 100 is adapted to perform simulation-based functional verification of a hardware design ("design-under-test"). The design-under-test may describe one or more hardware modules, for example, a processor, a controller, a CPU, a DSP, a bus-bridge, a circuit, an IC, a DMA controller, or the like. Accordingly, system 100 may include one or more hardware components and/or software components able to perform one or more operations of the functional verification process. For example, in the demonstrative embodiments of FIG. 1, system 100 includes a test generator 130 to generate random or pseudo-random values used in the verification process. In one example, test generator 130 generates at least one test case 162, e.g., as described below.

In some demonstrative embodiments of the invention, system 100 may include an abstract Knowledge Base (KB) 132 to store a formal description of the specification of the design-under test, optionally including, for example, testing knowledge, testing constraints, testing coverage criteria, and/or other information. In some embodiments, abstract knowledge base 132 includes, for example, a general model 133 of the design-under test, optionally including testing knowledge that may be helpful in providing test coverage and/or biasing the testing process towards "interesting" cases.

In some demonstrative embodiments, test generator 130 includes, for example, a test generator engine 150 adapted to receive a user input 140. User input may include, for example, a user request file 142 to be utilized by test generator engine 150. In some embodiments, user request file 142 includes one or more manipulation instructions 144 to be applied by test generator 150, as described in detail below.

In some demonstrative embodiments of the invention, test generator engine 150 includes a CSP solver 152 to solve a CSP corresponding to general model 133, and generate a set of test case transactions 154 (the "CSP-generated transactions"). For example, CSP solver 152 may construct a CSP from user request file 142 and general model 133, and produce transactions 154 which satisfy validity and/or quality constraints defined by request file 142 and/or model 133.

In some demonstrative embodiments, test generator engine 150 also includes a transaction generator 156 to automatically generate a plurality of manipulated transactions 158 by manipulating one or more of transactions 154, e.g., as described in detail below.

In some demonstrative embodiments, test generator engine 150 also includes a refiner 160 to generate test case 162 based on transactions 158. Refiner 160 may include any suitable refiner to generate a test case based on a plurality of test case transactions.

In some demonstrative embodiments, system 100 may also include an execution engine 164 to execute test case 162, for example, on an implementation of the design-under-test. For example, execution engine 164 includes a simulator of the design-under-test, or a hardware realization of the design-under-test.

According to some demonstrative embodiments of the invention, it may be desirable to generate relatively long test cases, e.g., test cases including a large number of transactions, having, for example, a relatively high test case quality, in a relatively short time period. According to one approach, a relatively long time period may be required for generating a long test case directly from a CSP ("a CSP-based test case"), for example, by using a CSP solver, e.g., CSP solver 152 to directly generate a large number of transactions. The long time period may result in a relatively long verification process. According to another approach, a fully random test case may be generated at a relatively short time period, e.g., without considering some or all of the set of constraints. However, such fully random test case may have relatively low quality and thus, may have a small chance of hitting "interesting" cases. According to yet another approach, a relatively short test case may be generated by a CSP solver ("the short test case") and the entire test case may be "looped". However, this test case may introduce very little randomness after the first loop. In yet another approach loop instructions may be manually inserted into the short test case. This approach is error-prone, allows little randomness, and requires expertise from the user.

According to some demonstrative embodiments of the invention, CSP solver 152 may generate a first number of transactions 154 relating to a relatively short test case, and transaction generator 156 may manipulate transactions 154 to generate a second number, e.g., bigger than the first number, of transactions 158, as described herein. Accordingly, test generator 150 may automatically generate test case 162 based on manipulated transactions 158 within a relatively short time period, wherein test case 162 includes a relatively long test case of relatively high quality. Additionally, randomness may be preserved over test case 162, e.g., since manipulated transactions 158 may include one or more mutated and/or permutated transactions different than transactions 154, as described herein.

In some demonstrative embodiments, a transaction of CSP-generated transactions 154 has a precondition and a post-condition. The precondition include, for example, any suitable condition or predicate that is to be satisfied, e.g., "true", prior to execution of the transaction. For example, a precondition may include an address translation path, e.g., for a processor to access a memory and/or Memory-mapped input-output (MMIO); a Translation Control Entry (TCE) to translate a Direct Memory Access (DMA) address; work queue element (WQE) request of an Infiniband architecture; an Interrupt controller configuration for interrupts; and the like. The precondition of the transaction may be satisfied based on one or more predefined initializations and/or post-conditions of previous transactions.

The post-condition includes, for example, any suitable condition or predicate that is to be satisfied, e.g., "true", after the execution of some section of code or after an operation in the transaction. For example, a post-condition may include a condition relating to whether data is transferred to a required address, in a required order; a condition relating to whether an interrupt is received; one or more coherency rules; and the like.

In some demonstrative embodiments, transaction generator 156 may classify the CSP-generated transaction as a type-1 transaction, e.g., a transaction having a post-condition, which does not affect preconditions of any of transactions 154, e.g., including the transaction itself; or as a type-2 transaction, e.g., a transaction which renders the preconditions of one or more of transactions 154 unsatisfied, once the transaction is performed. A type-1 transaction may include, for example, a transaction relating to a translation path, e.g., a DMA translation path, a MMIO translation path, and/or a memory load/store. A type-2 transaction may include, for example, a transaction related to a WQE, e.g., an Infiniband transfer, an Ethernet transfer, and the like.

In some embodiments, transaction generator 156 may manipulate a type-1 transaction to generate one or more of manipulated transactions 158, for example, by mutating the transaction, e.g., within a precondition range, which does not affect the post-conditions of transactions 154; and/or permuting the transaction in any suitable order. Transaction generator 156 may determine the precondition range, for example, based on one or more attributes of model 132 and/or request file 142, e.g., as described below.

In one example, transactions 154 include a type-1 transaction relating to a CPU accessing a specific real address of a memory using load store operations ("the memory-access transaction"). In this example, the transaction has a precondition, which is not affected by the transaction, e.g., an address translation path from an effective page to a real page. Accordingly, transaction generator 156 may duplicate and/or mutate the transaction to generate one or more of manipulated transactions 158, e.g., relating to accessing any other address within the same page. For example, if CSP-generated transactions 154 include the following "transaction A" relating to page 0x0000_0000_1234_5:

CPU loads 4 bytes from memory address 0x0000_0000_1234_5678, then transaction generator 156 may generate manipulated transactions 158 including a sequence of one or more of the following mutated transactions which access the same page of transaction A, by mutating transaction A:

CPU loads 8 bytes from address 0x0000_0000_1234_5670;

CPU stores 2 bytes to address 0x0000_0000_1234_567A;

CPU stores 4 bytes to address 0x0000_0000_1234_5676; and/or any other suitable transactions, e.g., to access the page 0x0000_0000_1234_5.

In some demonstrative embodiments of the invention, transaction generator 156 may manipulate the CSP-generated transaction based on manipulation instructions 144. For example, manipulation instructions 144 may define one or more elements, components and/or parameters of the transaction to be manipulated. In one example, manipulation instructions 144 may include instructions relating to a sequence of addresses to be accessed, and/or a sequence of operations to be performed, e.g., sequentially, in the same page of the CSP-generated transaction. For example, manipulation instructions 144 may define a sequence of operations, which when performed, may trigger a micro-architectural pre-fetch mechanism, which may be interesting, for example, for verification purposes.

In some demonstrative embodiments of the invention, transaction generator 156 may determine a precondition range, in which the memory-access transaction is to be manipulated, based on a page size, e.g., 4096 bytes, defined by model 132. Additionally or alternatively, manipulation instructions 144 may include a user-defined range, in which the memory-access transaction is to be manipulated. The user-defined range may define, for example, that test generator 156 is to manipulate the memory-access transaction within only a defined portion of the page size, e.g., on the same cache line. Such user-defined range may be useful for testing a specific user-defined scenario.

In some embodiments, transaction generator 156 may manipulate a type-2 transaction to generate one or more of manipulated transactions 158, for example, by duplicating and/or mutating one or more initializations, which meet the precondition of the transaction.

In one example, transactions 154 include at least one transaction ("the transfer transaction") to trigger a transfer operation including transferring one or more large memory buffers from one memory location to another memory location. The transfer operation is implemented, for example, by pointing a pointer to a first memory buffer to be transferred, and, after the first memory buffer is transferred, automatically moving the pointer ahead to point to a next memory buffer. Accordingly, the transfer transaction has a precondition of pointing the pointer to the first memory buffer. The transfer transaction is classified as a type-2 transaction, since post-conditions of the transfer operation, e.g., the memory buffer to which the pointer points, affect the preconditions of a following transaction. For example, a succeeding transaction will be performed on the next memory buffer, instead of on the first memory buffer. Accordingly, in one example transaction generator 156 may duplicate the first memory buffer, for example, by preparing an additional memory initialization. In another example, transaction generator 156 may add a resource initialization to the manipulated transaction resulting in "rewinding" the pointer to point to the first memory buffer.

Although the invention is not limited in this respect, in some demonstrative embodiments test generator 150 may be implemented using an "abstraction-refinement" scheme. According to these embodiments, CSP solver 152 generates transactions 154 including abstract transactions. In one example, transaction generator 156 identifies and/or classifies transactions 154 as type-1 or type-2 transactions based on the names of the abstract transactions.

In some embodiments, manipulated transactions 158 include a relatively large number of transactions compared, for example, to the number of CSP-generated transactions 154. In one example, the number manipulated transactions 158 is at least 50 times, for example, at least 100 times, e.g., at least 200 times, bigger than the number of CSP-generated transactions 154.

In some demonstrative embodiments of the invention, manipulated transactions 158 include more than 2000 transactions. In one example, manipulated transactions 158 include more than 10,000 transactions, for example, more than 20,000 transactions, e.g., more than 50,000 transactions. In another example, manipulated transactions 158 include more than 100,000 transactions, for example, more than 150,000 transactions, e.g., more than 200,000 transactions. In other embodiments, manipulated transactions 158 may include any other suitable number of transactions, e.g., less than 2000 transactions or more than 200,000 transactions.

The computational complexity of manipulating the CSP-generated transactions may be relatively low compared, for example, to the computational complexity required to generate substantially the same number of test case transactions by directly solving a CSP problem. Accordingly, test generator 150 may automatically generate test case 162, e.g., including a relatively large number of transactions 158, at a relatively short time period, for example, compared to the time period required to generate, e.g., by CSP solver 152, substantially the same number of test case transactions.

In some demonstrative embodiments of the invention, test generator 150 may automatically generate test case 162 at a rate at least five times faster, for example, at least ten times faster, e.g., at least 100 times faster, than a transaction generation rate of CSP solver 152. In one example, test generator 150 generates test case 162 including at least 20,000 transactions, for example, at least 100,000 transactions, e.g., at least 200,000 transactions, during a time period required for CSP solver 152 to generate 2000 transactions.

According to some demonstrative embodiments of the invention, test generator 150 may automatically generate test case 162 having a relatively high quality level, e.g., including a relatively large number of different transactions. In the example described above with relation to the memory access transaction, transaction generator 156 may manipulate the length of the address accessed, e.g., a length of 1, 2, 4, or 8 bytes; and/or manipulate the type of access, e.g., a load, a store; or an offset. Accordingly, test generator 156 may generate, for example, 2*(4096+4096/2+4096/4+4096/8) transactions, within a 4096-byte page, if a 2-byte access is performed to an even address. A larger number of transactions may be generated, for example, by including variations of data, using other lengths, permuting different combinations of transactions, creating different transaction patterns, and the like.

According to some demonstrative embodiments of the invention, request file 142 may define a testing scenario, in which test case 162 should not include a large number of non-identical transactions. For example, request file 142 may require that substantially all the transactions of test case 162 are to have different preconditions. In one example, request file 142 defines that test case 162 should include a large number, e.g., 100,000, of CPU access operations to different pages of a memory. According to this example, test generator engine 150 may generate test case 162 at a relatively long time period, e.g., substantially equal to a time required for CSP solver 152 to generate transactions 154

According to some demonstrative embodiments of the invention, manipulating the CSP-generated transactions, e.g., as described above, may enable targeting various micro-architecture scenarios that are only possible with relatively long test cases, e.g., including verifying various queues and/or buffers get filled, and the like; creating various "patterns" of transactions, for example, different patterns of load and/or store operations may be performed; and/or creating new "timings" of events, for example, when several processors access the same resource.

According to some demonstrative embodiments of the invention, test generator engine 154 may manipulate one or more transactions 154 during the generation of transactions 154 by CSP solver 152, e.g., before all transactions 154 are generated. For example, for one or more transaction requests defined by request file 142 test generator engine 154 may generate one or more transactions by either generating a new CSP-solved transaction using CSP solver 152, or manipulating or duplicating a previous transaction generated by CSP solver 152, e.g., a previously-generated transaction of transactions 154. This may enable, for example, preserving a request file scenario of request file 142.

Figure 2:
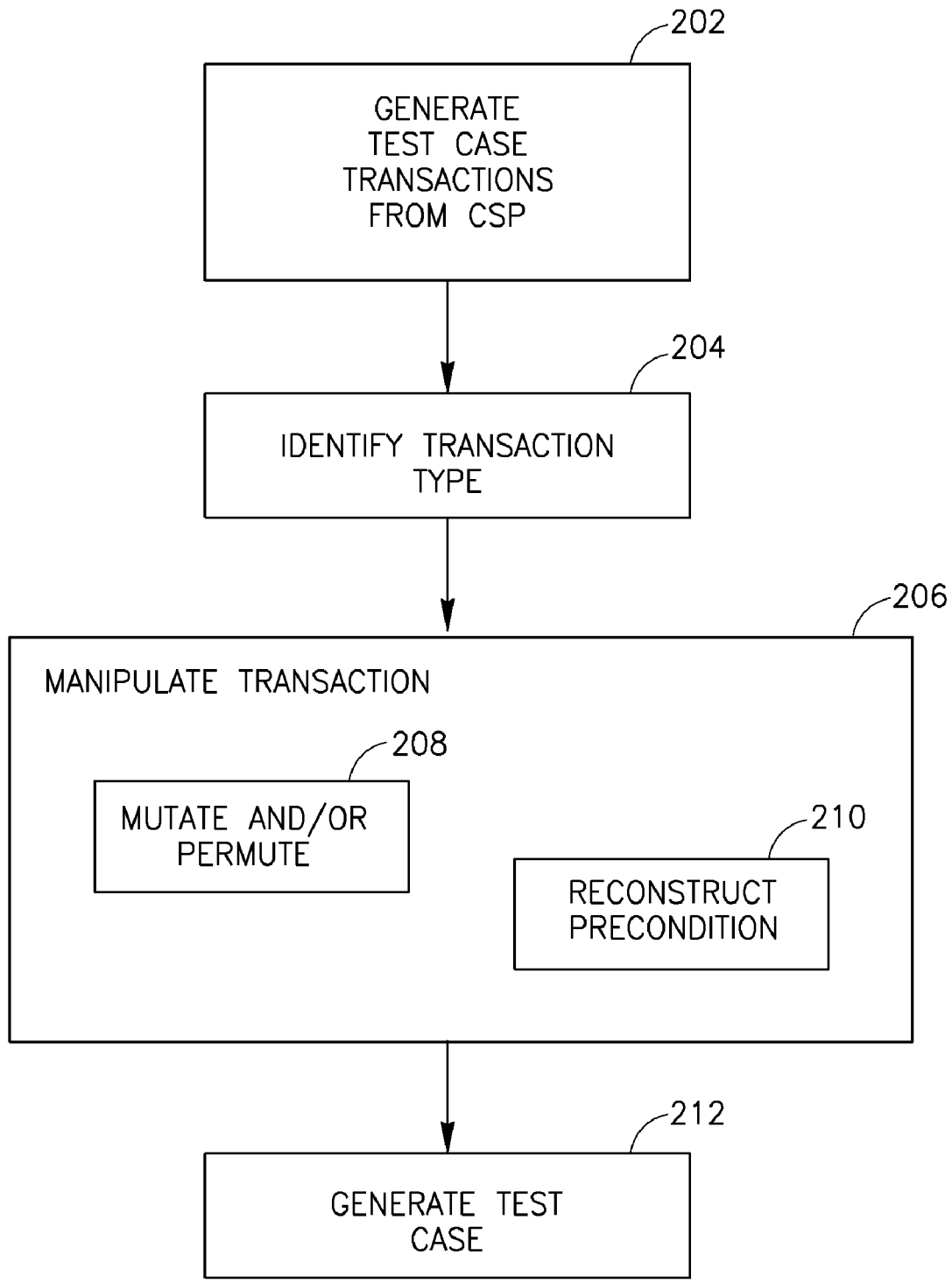
FIG. 2 is a schematic flow-chart illustration of a method of functional verification of a hardware design, in accordance with some demonstrative embodiments of the invention.

Reference is now made to FIG. 2, which schematically illustrates a method of functional verification of a hardware design, in accordance with some demonstrative embodiments of the invention. Although the invention is not limited in this respect, one or more operations of the method of FIG. 2 may be performed by design verification system 100 (FIG. 1), test generator 150 (FIG. 1), CSP solver 152 (FIG. 1), transaction generator 156 (FIG. 1), and/or refiner 160 (FIG. 1).

As indicated at block 202, the method may include generating a plurality of CSP-generated test case transactions resulting from a CSP. For example, CSP solver 152 (FIG. 1) may generate transactions 154 (FIG. 1), which represent, for example, an abstract test case, e.g., as described above.

As indicated at block 204, the method may also include identifying and/or classifying the CSP-generated transactions. For example, transaction generator 156 (FIG. 1) may identify and/or classify transactions 154 (FIG. 1) as type-1 and/or type-2 transactions, e.g., based on the name of the transactions, as described above.

As indicated at block 206, the method may include generating a plurality of manipulated transactions by manipulating one or more of the CSP-generated transactions. For example, transaction generator 156 (FIG. 1) may manipulate one or more of transactions 154 (FIG. 1) to generate manipulated transactions 158 (FIG. 1), e.g., as described above.

As indicated at block 208, the method may include mutating and/or permuting a CSP-generated transaction, e.g., if the CSP-generated transaction is a type-1 transaction. For example, transaction generator 156 (FIG. 1) may mutate and/or permute one or more of transactions 154 (FIG. 1), e.g., as described above.

As indicated at block 210, the method may include reconstruct one or more preconditions of a CSP-generated transaction, for example, by duplicating one or more initializations relating to the CSP-generated transaction, e.g., if the CSP-generated transaction is a type-2 transaction. For example, transaction generator 156 (FIG. 1) may generate one or more of manipulated transactions 158 (FIG. 1) by duplicating and/or mutating one or more initializations of transactions 154 (FIG. 1), e.g., as described above.

As indicated at block 212, the method may include generating a test case based on the manipulated transactions, e.g., by refining the manipulated transactions. For example, refiner 160 (FIG. 1) may refine manipulated transactions 158 (FIG. 1), e.g., as described above.

Other suitable operations or sets of operations may be used in accordance with embodiments of the invention.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid-state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method for verifying a hardware design, comprising the steps of:
   providing an input specification for a test case that includes a set of constraints;
   with a constraint satisfaction problem (CSP) solver generating CSP-generated transactions for the hardware design that satisfy the set of constraints;
   with a transaction generator altering at least a portion of the CSP-generated transactions to generate manipulated transactions that exceed the CSP-generated transactions in number;
   forming the test case for the hardware design from the manipulated transactions; and
   submitting the test case to an execution engine.

2. The method according to claim 1, wherein the CSP-generated transactions have a pre-condition that must be satisfied prior to an execution thereof in the test case and a post-condition that is satisfied after the execution, and wherein altering comprises classifying at least a portion of the CSP-generated transactions into a first type, wherein the post-condition thereof does not affect the pre-condition of any of the CSP-generated transactions and a second type wherein the execution thereof renders the precondition thereof unsatisfied.

3. The method according to claim 2, wherein altering further comprises duplicating at least a portion of the CSP-generated transactions that are classified as the first type.

4. The method according to claim 2, wherein altering comprises reconstructing the precondition of the CSP-generated transactions that are classified as the second type.

5. The method according to claim 1, wherein altering comprises duplicating at least one of the CSP-generated transactions without mutation thereof.

6. The method according to claim 1, wherein forming the test case comprises incorporating permutations of a set of the manipulated transactions therein, the permutations comprising at least first and second arrangements of the set of the manipulated transactions.

7. A computer software product for verifying a hardware design, including a computer storage medium in which computer program instructions are stored, the instructions organized into distinct software modules comprising a constraint satisfaction problem (CSP) solver and a transaction generator, which instructions, when executed by a computer, cause the computer to perform the steps of:
   accepting an input specification for a test case that includes a set of constraints;
   with the CSP solver generating CSP-generated transactions for the hardware design that satisfy the set of constraints;
   with the transaction generator altering at least a portion of the CSP-generated transactions to generate manipulated transactions that exceed the CSP-generated transactions in number;
   forming the test case for the hardware design from the manipulated transactions; and
   submitting the test case to an execution engine.

8. The computer software product according to claim 7, wherein the CSP-generated transactions having a pre-condition that must be satisfied prior to an execution thereof in the test case and a post-condition that is satisfied after the execution, and wherein altering comprises classifying at least a portion of the CSP-generated transactions into a first type, wherein the post-condition thereof does not affect the pre-condition of any of the CSP-generated transactions and a second type wherein the execution thereof renders the pre-condition thereof unsatisfied.

9. The computer software product according to claim 8, wherein altering further comprises duplicating at least a portion of the CSP-generated transactions that are classified as the first type.

10. The computer software product according to claim 8, and wherein altering comprises reconstructing the precondition of the CSP-generated transactions that are classified as the second type.

11. The computer software product according to claim 7, wherein altering comprises duplicating at least one of the CSP-generated transactions without mutation thereof.

12. The computer software product according to claim 7, wherein forming the test case comprises incorporating permutations of a set of the manipulated transactions therein, the permutations comprising at least first and second arrangements of the set of the manipulated transactions.

13. A data processing system for verifying a hardware design, comprising:
- a processor;
- a memory accessible to the processor storing programs and data objects therein, the programs including a constraint satisfaction problem (CSP) solver and a transaction generator, wherein execution of the programs cause the processor to perform the steps of:
- accepting an input specification for a test case that includes a set of constraints;
- with the CSP solver generating CSP-generated transactions for the hardware design that satisfy the set of constraints;
- with the transaction generator altering at least a portion of the CSP-generated transactions to generate manipulated transactions that exceed the CSP-generated transactions in number;
- forming the test case for the hardware design from the manipulated transactions; and
- submitting the test case to an execution engine.

14. The data processing system according to claim 13, wherein the CSP-generated transactions having a pre-condition that must be satisfied prior to an execution thereof in the test case and a post-condition that is satisfied after the execution, and wherein altering comprises classifying at least a portion of the CSP-generated transactions into a first type, wherein the post-condition thereof does not affect the pre-condition of any of the CSP-generated transactions and a second type wherein the execution thereof renders the pre-condition thereof unsatisfied.

15. The data processing system according to claim 14, wherein altering further comprises duplicating at least a portion of the CSP-generated transactions that are classified as the first type.

16. The data processing system according to claim 14, and wherein altering comprises reconstructing the pre-condition of the CSP-generated transactions that are classified as the second type.

17. The data processing system according to claim 13, wherein altering comprises duplicating at least one of the CSP-generated transactions without mutation thereof.

18. The data processing system according to claim 13, wherein forming the test case comprises incorporating permutations of a set of the manipulated transactions therein, the permutations comprising at least first and second arrangements of the set of the manipulated transactions.

19. A method for verifying a hardware design, comprising the steps of:
- providing an input specification for a test case that includes a set of constraints;
- with a constraint satisfaction problem (CSP) solver generating CSP-generated transactions for the hardware design that satisfy the set of constraints, the CSP-generated transactions having a pre-condition that must be satisfied prior to an execution thereof and a post-condition that is satisfied after the execution;
- with a transaction generator duplicating at least respective portions of the CSP-generated transactions without mutation thereof to generate new transactions that exceed the CSP-generated transactions in number;
- forming the test case for the hardware design from the new transactions; and
- submitting the test case to an execution engine.

20. The method according to claim 19, wherein the CSP-generated transactions have an initialization, further comprising the steps of:
- identifying CSP-generated transactions wherein the execution thereof renders the pre-condition thereof unsatisfied; and
- reconstructing the pre-condition of a portion of the identified CSP-generated transactions by duplicating the initialization thereof.

\* \* \* \* \*